United States Patent
Moon et al.

(10) Patent No.: US 10,064,183 B2
(45) Date of Patent: Aug. 28, 2018

(54) METHOD AND APPARATUS FOR CONFIGURING VIRTUAL BEAM IDENTIFIER, AND METHOD AND APPARATUS FOR ALLOCATING RESOURCES USING THE VIRTUAL BEAM IDENTIFIER

(71) Applicant: ELECTRONICS AND TELECOMMUNICATIONS RESEARCH INSTITUTE, Daejeon (KR)

(72) Inventors: Young Jin Moon, Daejeon (KR); Il Gyu Kim, Chungcheongbuk-do (KR); Youn Ok Park, Daejeon (KR); Young Jo Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 220 days.

(21) Appl. No.: 15/077,896

(22) Filed: Mar. 22, 2016

(65) Prior Publication Data
US 2016/0360531 A1  Dec. 8, 2016

(30) Foreign Application Priority Data

Jun. 4, 2015 (KR) .......................... 10-2015-0079465

(51) Int. Cl.
*H04B 7/06* (2006.01)
*H04L 5/00* (2006.01)
*H04W 72/04* (2009.01)

(52) U.S. Cl.
CPC ...... *H04W 72/0453* (2013.01); *H04B 7/0697* (2013.01); *H04L 5/005* (2013.01); *H04L 5/0053* (2013.01)

(58) Field of Classification Search
CPC .... H04B 7/024; H04B 7/0408; H04B 7/0413; H04B 7/0452; H04B 7/0456; H04B 7/0617; H04B 7/0634; H04B 7/0639; H04B 7/0695; H04B 7/0697; H04B 7/086; H04B 7/088; H04L 5/005; H04L 5/0053; H04W 16/28; H04W 72/0453
See application file for complete search history.

(56) References Cited

U.S. PATENT DOCUMENTS 6,104,935 A * 8/2000 Smith ..................... H01Q 1/246
 455/561
6,233,466 B1 * 5/2001 Wong ..................... H01Q 1/246
 370/342

(Continued)

FOREIGN PATENT DOCUMENTS

EP 3168999 A1 * 5/2017
JP 2001-016630 A 1/2001

(Continued)

*Primary Examiner* — Eric Nowlin
(74) *Attorney, Agent, or Firm* — Rabin & Berdo, P.C.

(57) ABSTRACT

A base station configures beam identifiers for a plurality of transmission beams. The base station configures virtual beam identifiers for the plurality of transmission beams based on the maximum number of transmission beams from the plurality of transmission beams that may spatially overlap one another, and the beam identifiers. The base station allocates resources using the virtual beam identifiers.

20 Claims, 4 Drawing Sheets

(56) References Cited

U.S. PATENT DOCUMENTS

| | | | | |
|---|---|---|---|---|
| 6,865,185 B1* | 3/2005 | Patel | H04L 47/12 | 370/310 |
| 7,664,533 B2* | 2/2010 | Logothetis | H01Q 1/246 | 342/368 |
| 8,280,445 B2* | 10/2012 | Yong | H04B 7/0695 | 370/328 |
| 8,335,480 B2* | 12/2012 | Na | H04B 7/0617 | 370/338 |
| 8,599,946 B2* | 12/2013 | Kim | H04B 7/0634 | 375/219 |
| 9,100,146 B2* | 8/2015 | Lee | H04W 16/28 | |
| 9,258,785 B2* | 2/2016 | Jeong | H04B 7/0408 | |
| 9,461,727 B2* | 10/2016 | Xue | H04B 7/0482 | |
| 9,614,596 B2* | 4/2017 | Takano | H04B 7/0413 | |
| 9,730,138 B2* | 8/2017 | Wang | H04W 88/02 | |
| 9,813,123 B2* | 11/2017 | Nam | H04B 7/0456 | |
| 9,813,867 B2* | 11/2017 | Prevatt | H04W 4/023 | |
| 9,898,550 B2* | 2/2018 | Ho | G06F 17/30946 | |
| 2005/0101352 A1* | 5/2005 | Logothetis | H01Q 1/246 | 455/562.1 |
| 2008/0095251 A1 | 4/2008 | Yeh et al. | | |
| 2009/0088090 A1* | 4/2009 | Na | H04B 7/0617 | 455/101 |
| 2011/0038308 A1* | 2/2011 | Song | H04B 7/0408 | 370/328 |
| 2011/0064156 A1* | 3/2011 | Kim | H04B 7/0634 | 375/267 |
| 2011/0065448 A1* | 3/2011 | Song | H04B 7/0632 | 455/452.2 |
| 2011/0211490 A1* | 9/2011 | Nikula | H04B 7/086 | 370/252 |
| 2012/0041966 A1* | 2/2012 | Kamali | H04M 1/72522 | 707/758 |
| 2013/0130703 A1* | 5/2013 | Cai | H04B 7/0491 | 455/447 |
| 2013/0194950 A1* | 8/2013 | Haghighat | H04W 24/02 | 370/252 |
| 2013/0235807 A1* | 9/2013 | Lee | H04W 16/28 | 370/329 |
| 2014/0073337 A1* | 3/2014 | Hong | H04W 16/28 | 455/452.1 |
| 2014/0120926 A1 | 5/2014 | Shin et al. | | |
| 2014/0139372 A1* | 5/2014 | Seol | H04B 7/086 | 342/367 |
| 2014/0323143 A1* | 10/2014 | Jung | H04B 7/0617 | 455/452.1 |
| 2015/0004918 A1* | 1/2015 | Wang | H04W 88/02 | 455/73 |
| 2015/0016379 A1* | 1/2015 | Nam | H04B 7/0456 | 370/329 |
| 2015/0131750 A1* | 5/2015 | Xue | H04B 7/0482 | 375/267 |
| 2015/0215873 A1* | 7/2015 | Jeong | H04B 7/0408 | 455/522 |
| 2015/0263797 A1* | 9/2015 | Takano | H04B 7/0413 | 375/267 |
| 2015/0372737 A1* | 12/2015 | Park | H04W 16/28 | 370/329 |
| 2016/0095130 A1* | 3/2016 | Ho | H04B 7/0417 | 370/329 |
| 2016/0105233 A1* | 4/2016 | Jalali | H04B 7/18504 | 342/359 |
| 2016/0127089 A1* | 5/2016 | Haghighat | H04W 24/02 | 370/329 |
| 2016/0174208 A1* | 6/2016 | Kim | H04W 72/046 | 370/329 |
| 2016/0242159 A1* | 8/2016 | Ho | H04B 7/0408 | |
| 2016/0277088 A1* | 9/2016 | Jo | H04B 7/0408 | |
| 2016/0360531 A1* | 12/2016 | Moon | H04W 72/0453 | |
| 2017/0201310 A1* | 7/2017 | Nardozza | H04B 7/0695 | |
| 2017/0207828 A1* | 7/2017 | Jung | H04B 7/0408 | |
| 2017/0207839 A1* | 7/2017 | Eitan | H04B 7/0617 | |
| 2017/0208613 A1* | 7/2017 | Nam | H04B 7/0456 | |
| 2017/0272223 A1* | 9/2017 | Kim | H04L 5/0048 | |
| 2017/0311301 A1* | 10/2017 | Yu | H04W 72/042 | |
| 2017/0317727 A1* | 11/2017 | Wang | H04B 7/0452 | |
| 2017/0339621 A1* | 11/2017 | Wang | H04W 48/16 | |
| 2018/0027522 A1* | 1/2018 | Lee | H04W 68/02 | |

FOREIGN PATENT DOCUMENTS

| | | |
|---|---|---|
| KR | 10-2013-0063658 A | 6/2013 |
| KR | 10-1304008 B1 | 9/2013 |
| KR | 20160062721 A * | 6/2016 |
| WO | WO-2016006964 A1 * | 1/2016 ............... H04B 7/04 |

* cited by examiner

METHOD AND APPARATUS FOR CONFIGURING VIRTUAL BEAM IDENTIFIER, AND METHOD AND APPARATUS FOR ALLOCATING RESOURCES USING THE VIRTUAL BEAM IDENTIFIER

CROSS-REFERENCE TO RELATED APPLICATION

This application claims priority to and the benefit of Korean Patent Application No. 10-2015-0079465 filed in the Korean Intellectual Property Office on Jun. 4, 2015, the entire contents of which are incorporated herein by reference.

BACKGROUND OF THE INVENTION (a) Field of the Invention

The present invention relates to a method and apparatus for configuring a virtual beam identifier, and a method and apparatus for allocating resources using the virtual beam identifier.

(b) Description of the Related Art

The use of smart terminals is increasing exponentially, and future services are expected to call for much higher data rates than current ones. To meet this requirement, research on the development of 5G mobile communication systems is now actively underway. Researchers are particularly looking at the use of millimeter wave frequency bands in mobile and wireless communication systems as a candidate technology that can be used in 5G mobile and wireless communication systems. There is a lot of room for the millimeter wave frequency bands to be used in 5G mobile communication systems due to the lack of currently available frequency resources; however, they have the drawback of high propagation loss, especially rain fade, caused by refraction and penetration because of characteristics of the millimeter wave frequency bands. Still, the millimeter wave frequency bands have high directivity, enable broadband transmission, and permit the use of small and lightweight antennas and transmitters/receivers.

When using the millimeter wave bands for mobile and wireless communication, a wide bandwidth of 1 GHz or greater may be divided into a plurality of frequency assignments (FS), and space resources may also be utilized using a beamforming technique. For this reason, the technology of using millimeter wave bands for mobile and wireless communication is expected to drastically improve radio capacity.

However, in light of the characteristics of millimeter frequencies, millimeter wave wireless communication systems are able to transmit more precise beams to a terminal in a particular beam service area through beamforming, as compared to existing mobile and wireless communication systems, but it is not possible to perfectly block the effect of inter-beam interference at beam edges. Therefore, there is a need for a way to improve reception performance by minimizing the effect of inter-beam interference at beam edges.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and apparatus for preventing overlapping of frequency resources between beams and minimizing inter-beam interference.

Another aspect of the present invention provides a method and apparatus that allow resources to overlap as little as possible through efficient allocation of resources among beams, in order to mitigate reception performance degradation caused by inter-beam interference.

Yet another aspect of the present invention provides a method and apparatus for configuring a beam identifier for each beam, and a method and apparatus for creating a virtual beam identifier based on the configured beam identifier.

A further aspect of the present invention provides a method and apparatus that distribute resources for a terminal among FAs and implement frequency hopping using a virtual beam identifier as an offset.

An exemplary embodiment of the present invention provides a method of allocating resources by a base station that transmits a plurality of transmission beams. The resource allocation method may include: configuring beam identifiers for the plurality of transmission beams; configuring virtual beam identifiers for the plurality of transmission beams based on the maximum number of transmission beams from the plurality of transmission beams that may spatially overlap one another, and the beam identifiers; and allocating resources using the virtual beam identifiers.

The configuring of virtual beam identifiers may include: when the maximum number is K (K is a natural number equal to or greater than 2), performing a modulo K operation on the value of each beam identifier to calculate a remainder; and configuring the remainder for each beam identifier as the value of the virtual beam identifier for each of the plurality of transmission beams.

The configuring of beam identifiers may include: creating P (P is a natural number) beam sets by dividing M×N (M and N are natural numbers) transmission beams formed by M×N transmission antenna elements by K; and configuring beam identifiers for the P beam sets in such a way that their values are arranged in the same sequence as the P beam sets.

The configuring of beam identifiers for the P beam sets may include configuring K beam identifiers for transmission beams in a J-th (J is a natural number) beam set, among the P beam sets, in such a way that their values are arranged in the same sequence as the transmission beams in the J-th beam set.

The M and the N may be the same natural number equal to or greater than 2.

The K may be 4.

The J-th beam set may include 2×2 transmission beams.

The allocating of resources may include: segmenting a first frequency resource for a terminal into the number of frequency assignments (FA) used by a first transmission beam to which the terminal belongs among the plurality of transmission beams; and allocating the resource segments to the terminal by using a first virtual beam identifier for the first transmission beam among the plurality of virtual beam identifiers.

The allocating of the resource segments to the terminal may include distributing the resource segments among the FAs used by the first transmission beam through frequency hopping using the first virtual beam identifier as an offset.

The base station may be incorporated in a millimeter wave wireless communication system.

Another exemplary embodiment of the present invention provides a method for a base station to configure a virtual beam identifier. The virtual beam identifier configuration method may include: forming M×N (M and N are natural numbers) transmission beams by M×N transmission antenna elements; configuring M×N beam identifiers for the M×N transmission beams; and configuring M×N virtual beam identifiers for the M×N transmission beams based on the maximum number of transmission beams from the M×N transmission beams that may spatially overlap one another, and the beam identifiers.

The configuring of virtual beam identifiers may include: when the maximum number is K (K is a natural number equal to or greater than 2), performing a modulo K operation on the value of each of the M×N beam identifiers to calculate a remainder; and configuring the remainder for each beam identifier as the value of the virtual beam identifier for each of the M×N transmission beams.

Yet another exemplary embodiment of the present invention provides a base station. The base station may include a memory, and a processor connected to the memory.

The processor may configure a plurality of beam identifiers for a plurality of transmission beams formed by a plurality of transmission antenna elements, and configure a plurality of virtual beam identifiers for the plurality of transmission beams based on the maximum number of transmission beams out of the plurality of transmission beams that may spatially overlap one another, and the beam identifiers.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include all or some of the functions of the MT, MS, AMS, HR-MS, SS, PSS, AT, UE, etc.

In the specification, a base station (BS) may indicate an advanced base station (ABS), a high reliability base station (HR-BS), a node B (NodeB), an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, a small base station, or a macro base station, and it may include entire or partial functions of the ABS, HR-BS, nodeB, eNodeB, AP, RAS, BTS, MMR-BS, RS, ARS, HR-RS, small base station, or macro base station.

Figure 1:
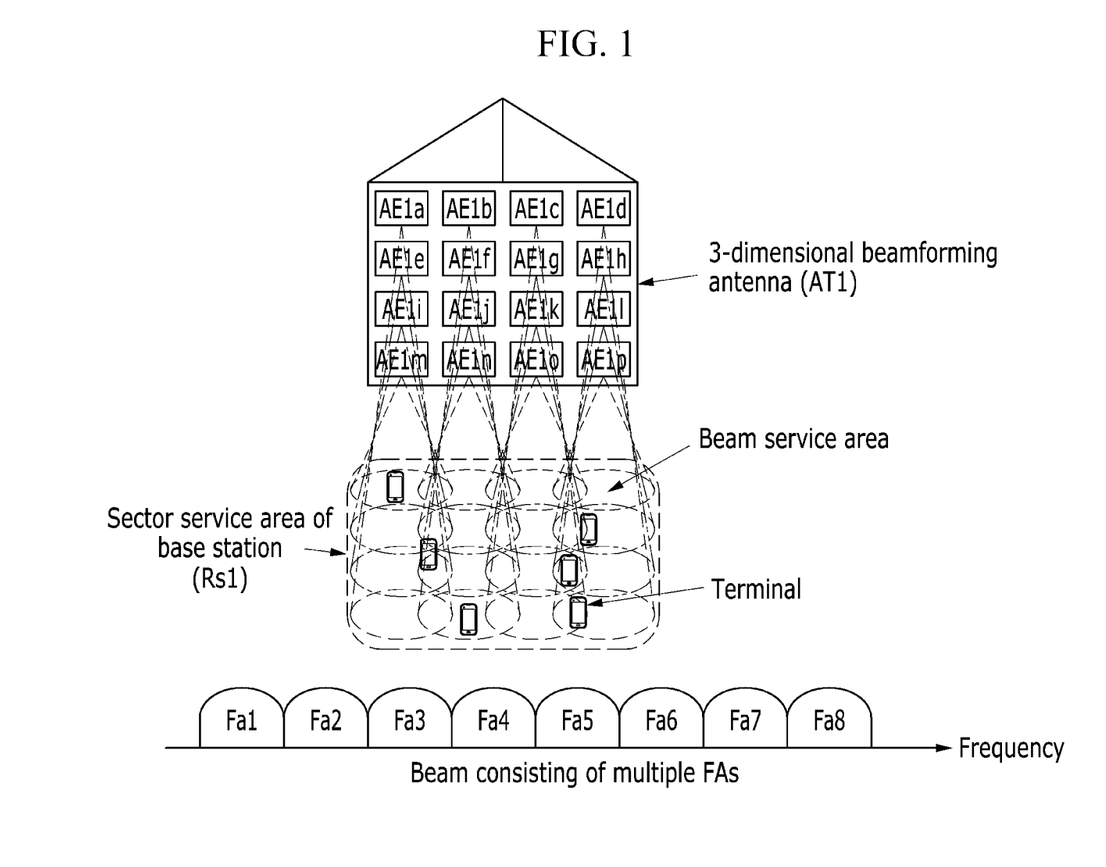
FIG. 1 is a view showing a millimeter wave wireless communication system using 3-dimensional beamforming.

FIG. 1 is a view showing a millimeter wave wireless communication system using 3-dimensional beamforming. Specifically, FIG. 1 illustrates that, in a millimeter wave mobile and wireless communication environment, beams formed by a 3-dimensional beamforming antenna AT1 at a base station cover particular beam service areas, respectively.

The base station includes the 3-dimensional beamforming antenna AT1. The 3-dimensional beamforming antenna AT1 may include a plurality of transmission antenna elements AE1$a$ to AE1$p$. The base station may manage a plurality of sectors using the 3-dimensional beamforming antenna AT1. For ease of explanation, FIG. 1 exemplifies a base station that manages three sectors. For example, the base station may transmit a plurality of beams formed by the plurality of antenna elements AE1$a$ to AE1$p$ to a sector service area Rs1 corresponding to a particular sector. Specifically, the transmission antenna elements APE1$a$ to AE1$p$ may be individually run to form 3-dimensional beams, and each beam may be used to transmit a signal to a terminal located in a beam service area for the corresponding beam. That is, a single transmission antenna element AE1$a$ to AE1$p$ may create a single beam, and this single beam may cover a single service area.

Each beam may consist of a plurality of frequency assignments (FA). Specifically, each beam may use some or all of the FAs. FIG. 1 illustrates that the total number of FAs Fa1 to Fa8 is 8. The base station may use each beam formed by each transmission antenna element AE1$a$ to AE1$p$ to cover a single beam service area, and use multiple beams to cover the sector service area Rs1 corresponding to a single sector.

Although beams formed by the transmission antenna elements AE1$a$ to AE1$p$ are more precise than those formed by existing systems, it is not possible to completely eliminate inter-beam interference at beam edges due to sidelobe beams. Accordingly, it is inevitable that the terminals located at the beam edges will simultaneously receive multiple beams. If resources are individually allocated to each individually-run beam, the terminals at the beam edges will suffer from severe inter-beam interference compared to those located in the center of beams due to overlapping of resources allocated among adjacent beams. This may lead to degradation in reception performance. As a result, the terminals at the beam edges may not achieve a proper data rate. Accordingly, there is a need for a resource allocation approach that allows avoiding inter-beam interference in the above-described environment.

Figure 2:
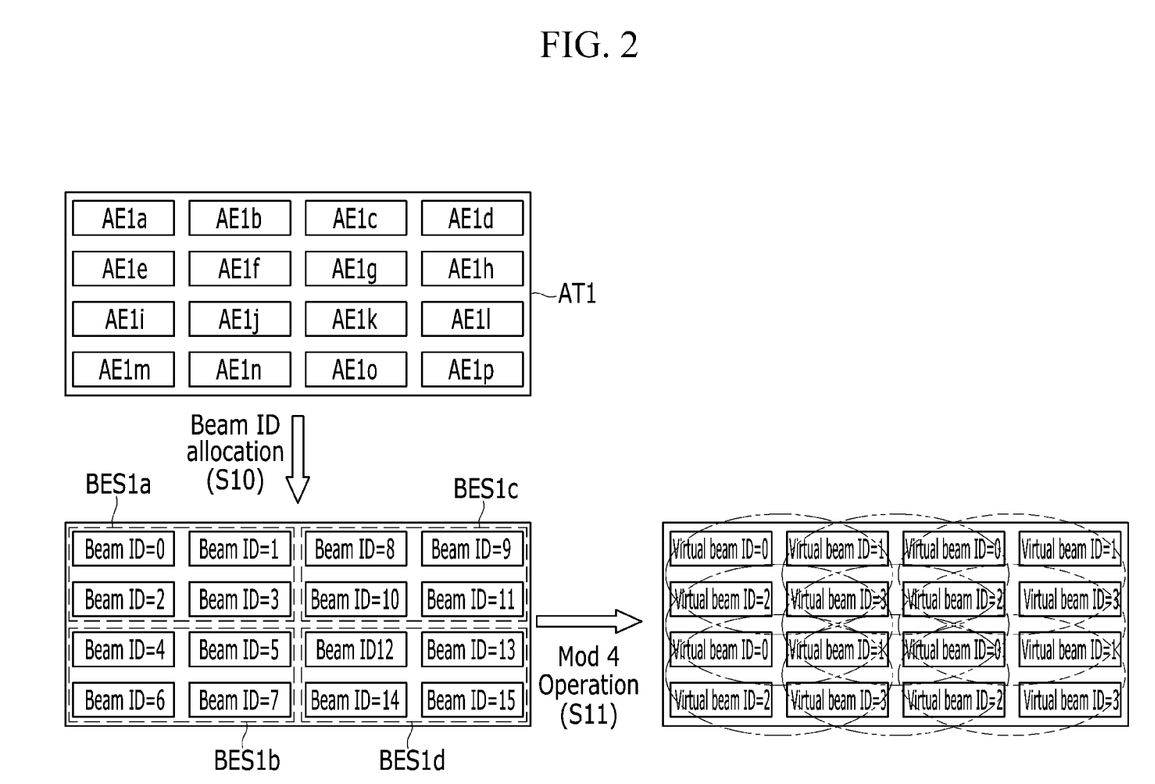
FIG. 2 is a view showing a method for configuring a beam identifier and a virtual beam identifier according to an exemplary embodiment of the present invention.

FIG. 2 is a view showing a method for configuring a beam identifier (hereinafter, 'beam ID') and a virtual beam identifier (hereinafter, 'virtual beam ID') according to an exemplary embodiment of the present invention. Specifically, FIG. 2 is a view showing a method for a base station to configure a beam ID and a virtual beam ID in the 3-dimensional beamforming environment (e.g., 3-dimensional beamforming millimeter wave mobile communication uplink environment) described above with reference to FIG. 1. For ease of explanation, FIG. 2 assumes that the base station uses 4×4 transmission antennas. The base station may transmit a maximum of sixteen transmission beams per sector. However, this is merely an example, and the present invention also may be applicable to M×N (M and N are natural numbers) transmission antennas, which are different from the 4×4 transmission antennas.

3-dimensional transmission beams respectively formed by the transmission antenna elements AE1$a$ to AE1$p$ are spatially separated from one another and cover their own beam service areas. Thus, a maximum of four transmission beams may overlap one another at a particular location where a terminal exists. For example, four transmission beams formed by four transmission antenna elements AE1*a*, AE1*b*, AE1*e*, and AE1*f* may spatially overlap one another.

Hereinafter, an exemplary embodiment of the present invention will be described with an example in which the maximum number (hereinafter, 'first maximum number') of transmission beams that may spatially overlap one another is 4. However, this is merely an example, and the present invention may also be applicable when the first maximum number is not 4 but K (K is a natural number equal to or greater than 2).

The base station allocates beam IDs to 4×4 transmission beams formed by the 4×4 transmission antennas elements AE1*a* to AE1*p* (S10). Specifically, the base station may divide the 16 transmission antenna elements AE1*a* to AE1*p* into 2×2 transmission antenna units because the first maximum number is 4. For example, the base station may group four transmission beams formed by four transmission antenna elements AE1*a*, AE1*b*, AE1*e*, and AE1*f* together as a single beam set BES1*a*, four transmission beams formed by four transmission antenna elements AE1*i*, AE1*j*, AE1*m*, and AE1*n* as a single beam set BES1*b*, four transmission beams formed by four transmission antenna elements AE1*c*, AE1*d*, AE1*g*, and AE1*h* as a single beam set BES1*c*, and four transmission beams formed by four transmission antenna elements AE1*k*, AE1*l*, AE1*o*, and AE1*p* as a single beam set BES1*d*. Also, the base station may configure beam IDs for the four beam sets BES1*a* to BES1*d* in such a way that the beam IDs are distinct from one another. Specifically, the base station may configure beam IDs for the four beam sets BES1*a* to BES1*d* in such a way that their values are arranged in the same sequence as the four beam sets BES1*a* to BES1*d*. The values of the beam IDs for the four beam sets BES1*a* to BES1*d* may increase according to the positions of the four beam sets BES1*a* to BES1*d*.

FIG. 2 illustrates that the base station configures beam IDs for the beam sets BES1*a* to BES1*d* in the sequence of top-left, bottom-left, top-right, and bottom-right. That is, the base station may configure beam IDs 0 to 15 in the sequence of beam set BES1*a*, beam set BES1*b*, beam set BES1*c*, and beam set BES1*d*. However, this is merely an example, and the base station may configure beam IDs in a different sequence from the sequence shown in FIG. 2 (e.g., in the sequence of beam set BES1*a*, beam set BES1*c*, beam set BES1*b*, and beam set BES1*d*, or in the sequence of beam set BES1*a*, beam set BES1*d*, beam set BES1*c*, and beam set BES1*b*). Also, the base station may configure four beam IDs for four transmission beams in each beam set BES1*a* to BES1*d* in such a way that their values are arranged in the same sequence as the four transmission beams in each beam set BES1*a* to BES1*d*. The values of the four beam IDs for the four transmission beams in each beam set BES1*a* to BES1*d* may increase according to the positions of the four transmission beams in each beam set BES1*a* to BES1*d*.

FIG. 2 illustrates that the base station configures four beam IDs for four transmission beams in each beam set BES1*a* to BES1*d* in the sequence of top-left, top-right, bottom-left, and bottom-right. For example, for the four transmission beams in the beam set BES1*a*, the base station may configure the value of the beam ID for the top-left transmission beam (i.e., the transmission beam formed by the transmission antenna element AE1*a*) to 0, the value of the beam ID for the top-right transmission beam (i.e., the transmission beam formed by the transmission antenna element AE1*b*) to 1, the value of the beam ID for the bottom-left transmission beam (i.e., the transmission beam formed by the transmission antenna element AE1*e*) to 2, and the value of the beam ID for the bottom-right transmission beam (i.e., the transmission beam formed by the transmission antenna element AE1*f*) to 3. However, this is merely an example, and the base station may configure beam IDs for transmission beams in each beam set BES1*a* to BES1*d* in a different sequence from the sequence shown in FIG. 2 (e.g., in the sequence of top-left, bottom-left, top-right, and bottom-right, or in the sequence of top-right, bottom-right, bottom-left, and top-right).

The base station creates a virtual beam ID for each transmission beam by performing a modulo 4 operation on the beam IDs configured in the above-described manner (S11). Specifically, if the beam ID for a transmission beam has a value of 0, 4, 8, or 12, the base station may configure the value of the virtual beam ID for the transmission beam to 0 (the remainder for the beam ID), if the beam ID for a transmission beam has a value of 1, 5, 9, or 13, the base station may configure the value of the virtual beam ID for the transmission beam to 1 (the remainder for the beam ID), if the beam ID for a transmission beam has a value of 2, 6, 10, or 14, the base station may configure the value of the virtual beam ID for the transmission beam to 2 (the remainder for the beam ID), and if the beam ID for a transmission beam has a value of 3, 7, 11, or 15, the base station may configure the value of the virtual beam ID for the transmission beam to 3 (the remainder for the beam ID). On the other hand, if the first maximum number is not 4 but K, the base station may perform a modulo K operation to create a virtual beam ID for each transmission beam. As illustrated in FIG. 2, 2×2 transmission beams grouped together as a single beam set have virtual beam IDs 0, 1, 2, and 3 that make them always distinct, regardless of the sequence in which the 2×2 transmission beams are arranged.

Meanwhile, the base station may use a virtual beam ID as a frequency hopping offset in order to prevent inter-beam resource collision as much as possible. A method for the base station to allocate resources through frequency hopping that uses a virtual beam ID as an offset will be described in detail with reference to FIG. 3.

Figure 3:
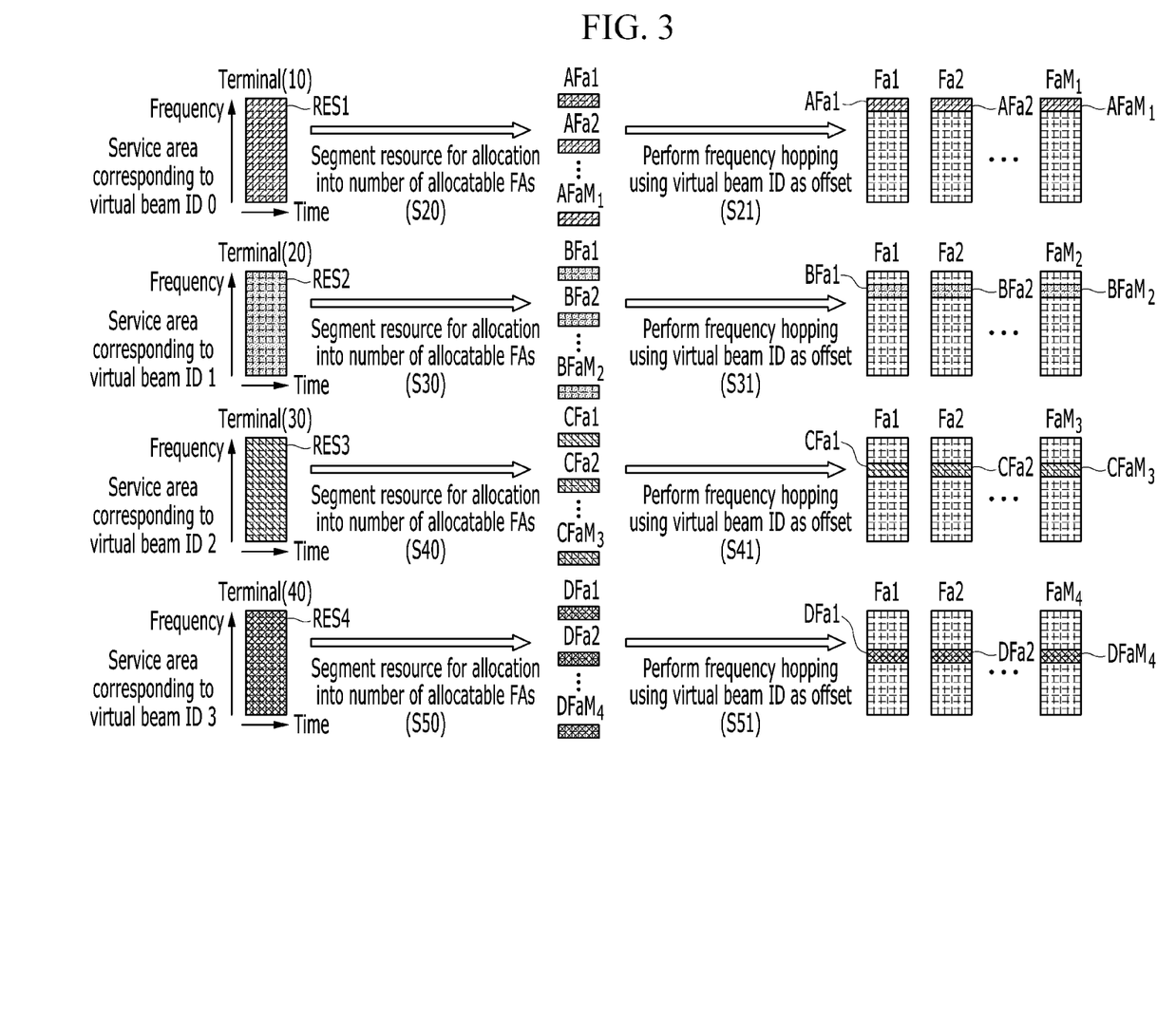
FIG. 3 is a view showing a method of allocating resources to each terminal by using multiple FAs and virtual beam IDs for transmission beams according to an exemplary embodiment of the present invention.

FIG. 3 is a view showing a method of allocating resources to each terminal by using multiple FAs and virtual beam IDs for transmission beams according to an exemplary embodiment of the present invention. Specifically, FIG. 3 is a view showing a method for the base station to allocate resources in a way that minimizes inter-beam interference using virtual beam IDs created as shown in FIG. 2. For ease of explanation, FIG. 3 assumes that 16 beam service areas exist in one sector, and each transmission beam supports multiple FAs.

The base station distributes a resource block (resource area) for each terminal 10 to 40 among all frequency resource areas for a transmission beam to which each terminal 10 to 40 belongs, and then allocates resources to each terminal 10 to 40. Specifically, the base station may segment each frequency resource block RES1 to RES3 for each terminal 10 to 40 in a particular virtual beam service area into the number $M_1$, $M_2$, $M_3$, and $M_4$ of allocatable FAs that are used by a particular virtual beam (S20, S30, S40, and S50). The virtual beam service area refers to a beam service area corresponding to a virtual beam ID. For example, a virtual beam service area corresponding to virtual beam ID 0 may be a beam service area corresponding to virtual beam ID 0, virtual beam ID 4, virtual beam ID 8, or virtual beam ID 12. FIG. 3 assumes that the terminal 10 is located in the virtual beam service area corresponding to virtual beam ID 0, the terminal 20 is located in a virtual beam service area corresponding to virtual beam ID 1, the terminal 30 is located in a virtual beam service area corresponding to virtual beam ID 2, and the terminal 40 is located in a virtual beam service area corresponding to virtual beam ID 3. Specifically, the base station may segment the frequency resource block RES1 for the terminal 10 into the number $M_1$ of FAs Fa1 to $FaM_1$ used by a transmission beam (whose virtual beam ID is 0) to which the terminal 10 belongs (S20), and segment the frequency resource area RES2 for the terminal 20 into the number $M_2$ of FAs Fa1 to $FaM_2$ used by a transmission beam (whose virtual beam ID is 1) to which the terminal 20 belongs (S30). Also, the base station may segment the frequency resource block RES3 for the terminal 30 into the number $M_3$ of FAs Fa1 to $FaM_3$ used by a transmission beam (whose virtual beam ID is 3) to which the terminal 30 belongs (S40), and segment the frequency resource block RES4 for the terminal 40 into the number $M_4$ of FAs Fa1 to $FaM_4$ used by a transmission beam (whose virtual beam ID is 4) to which the terminal 40 belongs (S50). In this case, the number $M_1$ to $M_4$ of allocatable FAs for each transmission beam may be the same or different, and may be equal to or less than the total number (e.g., 8) of FAs.

Specifically, the base station distributes the frequency resource block segments AFa1 to $AFaM_1$, BFa1 to $BFaM_2$, CFa1 to $CFaM_3$, and DFa1 to $DFaM_4$ among the FAs Fa1 to $FaM_1$, Fa1 to $FaM_2$, Fa1 to $FaM_3$, and Fa1 to $FaM_4$ through frequency hopping using a virtual beam ID as an offset (S21, S31, S41, and S51). Specifically, the base station may allocate the frequency resource block segments AFa1 to $AFaM_1$ to the terminal 10 through frequency hopping using the value 0 of the virtual beam ID as an offset (S21). Thus, the terminal 10 may be assigned the frequency resource areas (e.g., resources in the first and second rows, AFa1 to $AFaM_1$) corresponding to the offset value 0 among the frequency resource areas in each of the FAs Fa1 to $FaM_1$. Also, the base station may allocate the frequency resource block segments BFa1 to $BFaM_2$ to the terminal 20 through frequency hopping using the value 1 of the virtual beam ID as an offset (S31). Thus, the terminal 20 may be assigned the frequency resource areas (e.g., resources in the third and fourth rows, BFa1 to $BFaM_2$) corresponding to the offset value 1 among the frequency resource areas in each of the FAs Fa1 to $FaM_2$. Also, the base station may allocate the frequency resource block segments CFa1 to $CFaM_3$ to the terminal 30 through frequency hopping using the value 2 of the virtual beam ID as an offset (S41). Thus, the terminal 30 may be assigned the frequency resource areas (e.g., resources in the fifth and sixth rows, CFa1 to $CFaM_3$) corresponding to the offset value 2 among the frequency resource areas in each of the FAs Fa1 to $FaM_3$. Also, the base station may allocate the frequency resource block segments DFa1 to $DFaM_4$ to the terminal 40 through frequency hopping using the value 3 of the virtual beam ID as an offset (S51). Thus, the terminal 40 may be assigned the frequency resource areas (e.g., resources in the seventh and eighth rows, DFa1 to $DFaM_4$) corresponding to the offset value 3 among the frequency resource areas in each of the FAs Fa1 to $FaM_4$.

As shown in FIG. 3, once the base station distributes resources for terminals 10 to 40 among a plurality of FAs Fa1 to $FaM_1$, Fa1 to $FaM_2$, Fa1 to $FaM_3$, and Fa1 to $FaM_4$ for transmission beams to which the terminals 10 to 40 belong, frequency diversity may be achieved. Moreover, the base station may control resource allocation among interfering beams to avoid resource collision by allocating frequency resources among beams in a more precise way. Also, the base station may implement frequency hopping on the same number of frequency resource block segments AFa1 to $AFaM_1$, BFa1 to $BFaM_2$, CFa1 to $CFaM_3$, and DFa1 to $DFaM_4$ as the number $M_1$, $M_2$, $M_3$, and $M_4$ of FAs, thereby preventing resource collision among beams.

Figure 4:
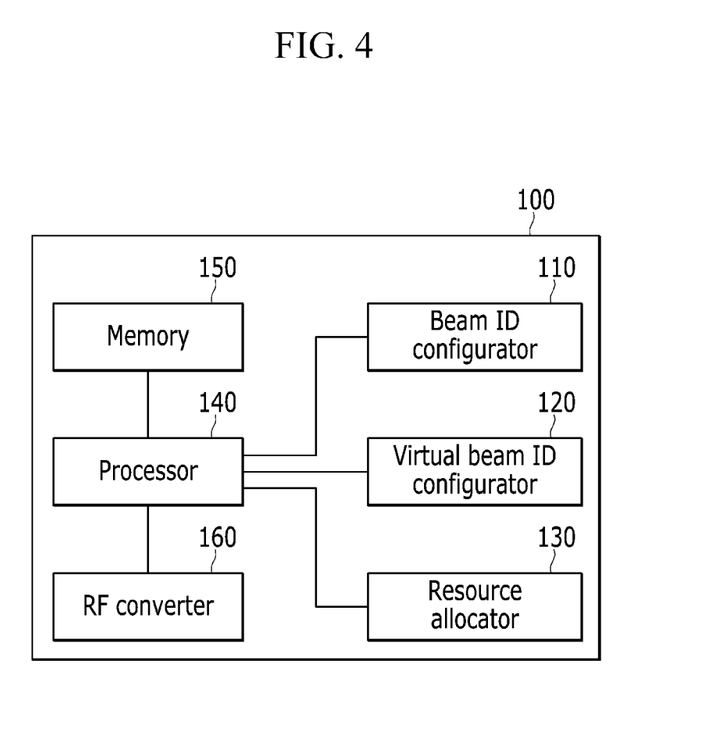
FIG. 4 is a view showing the configuration of a base station according to an exemplary embodiment of the present invention.

FIG. 4 is a view showing the configuration of the base station 100 according to an exemplary embodiment of the present invention.

The base station 100 includes a beam ID configurator 110, a virtual beam ID configurator 120, a resource allocator 130, a processor 140, a memory 150, and a radio frequency (RF) converter 160.

The beam ID configurator 110 configures a beam ID for each transmission beam. Specifically, the beam ID configurator 110 may perform procedures, functions, and methods associated with the beam ID configuration explained in this specification.

The virtual beam ID configurator 120 configures a virtual beam ID for each transmission beam. Specifically, the virtual beam ID configurator 120 may perform procedures, functions, and methods associated with the virtual beam ID configuration explained in this specification.

The resource allocator 130 allocates resources using a virtual beam ID. Specifically, the resource allocator 130 may perform procedures, functions, and methods associated with the resource allocation explained in this specification.

The processor 140 may be configured to implement the functions, procedures, and methods associated with the base station explained in this specification. Each component of the base station 100 may be executed (controlled) by the processor 140.

The memory 150 is connected to the processor 140, and stores various information associated with the operation of the processor 140.

The RF converter 160 is connected to the processor 140, and transmits or receives radio signals. The base station 100 may have a single antenna or multiple antennas.

According to an exemplary embodiment of the present invention, it is possible to reduce inter-beam interference at beam edges in a millimeter wave wireless communication environment where precise beams are formed and sent to a particular beam service area through 3-dimensional beamforming. Although a millimeter wave wireless communication system is able to transmit precise beams to spatially separated beam service areas through 3-dimensional beamforming, it does not allow forming beams that are precise enough to completely eliminate inter-beam interference at beam edges caused by sidelobe beams. Nevertheless, the above-described resource allocation method may minimize inter-beam interference at beam edges and overcome reception performance degradation caused by inter-beam interference.

According to an exemplary embodiment of the present invention, the base station 100 configures a beam ID for each transmission beam, creates a virtual beam ID based on the configured beam ID, segments a frequency resource for a terminal into the number of allocatable FAs for a transmission beam to which the terminal belongs, and performs frequency hopping based on the virtual beam ID for the frequency resource segments. Therefore, frequency diversity can be achieved, and inter-beam interference caused by overlapping of frequency resources among beams can be minimized. As a result, the reception performance of terminals may be improved.

Exemplary embodiments of the present invention are implemented not only through the apparatus and method, but may be implemented through a program that realizes functions corresponding to the configuration of the exemplary embodiments of the present invention or a recording medium in which the program is recorded. The invention can be easily implemented by those skilled in the art as described in the exemplary embodiments.

According to an embodiment of the present invention, resources may be allocated by determining beam identifiers and virtual beam identifiers, distributing resources for each terminal among FAs, and using a virtual beam identifier as an offset. Therefore, frequency diversity may be achieved, and inter-beam interference may be minimized. As a result, reception performance may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating resources by a base station that transmits a plurality of transmission beams from a plurality of antennas, the method comprising:
    configuring, by the base station, beam identifiers for the plurality of transmission beams, such that each transmission beam has a unique beam identifier;
    configuring, by the base station, virtual beam identifiers for the plurality of transmission beams based on the a maximum number of transmission beams from the plurality of transmission beams that are adjacent to one another when the beams are transmitted, and based on the beam identifiers, the beam identifiers are different than the virtual beam identifiers; and
    allocating the resources using the virtual beam identifiers,
    wherein configuring, by the base station, the virtual beam identifiers comprises:
        grouping the plurality of transmission beams into beam sets of spatially adjacent transmission beams; and
        assigning a different virtual beam identifier to each transmission beam within each separate beam set, each beam set including the same virtual beam identifiers as each other beam set, the virtual beam identifiers being assigned such that the virtual beam identifier of each transmission beam is different from the virtual beam identifier of each adjacent transmission beam of an adjacent beam set, and
    wherein the transmitting of the plurality of transmission beams by the base station includes transmitting at least one transmission beam among the plurality of transmission beams to partially overlap at least one adjacent transmission beam of an adjacent beam set.

2. The method of claim 1, wherein the configuring of virtual beam identifiers comprises:
    when the maximum number of transmission beams is K (K is a natural number equal to or greater than 2), performing a modulo K operation on a value of each beam identifier to calculate a remainder; and
    configuring the remainder for each beam identifier as a value of the virtual beam identifier for each of the plurality of transmission beams.

3. The method of claim 2, wherein the configuring of beam identifiers comprises:
    creating P (P is a natural number) beam sets by dividing M×N (M and N are natural numbers, and M×N is a product of multiplication of the natural number M by the natural number N) transmission beams formed by M×N transmission antenna elements by K; and
    configuring beam identifiers for the P beam sets in such a way that the values of the beam identifiers are arranged in a same sequence as the P beam sets.

4. The method of claim 3, wherein the configuring of beam identifiers for the P beam sets comprises configuring K beam identifiers for transmission beams in a J-th (J is a natural number) beam set, among the P beam sets, in such a way that the values of the beam identifiers are arranged in a same sequence as the transmission beams in the J-th beam set.

5. The method of claim 4, wherein the M and the N are a same natural number equal to or greater than 2,
    the K is 4, and
    the J-th beam set comprises 2×2 transmission beams.

6. The method of claim 2, wherein the allocating of resources comprises:
    segmenting a first frequency resource for a terminal into a number of frequency assignments (FA) used by a first transmission beam to which the terminal belongs among the plurality of transmission beams; and
    allocating resource segments to the terminal by using a first virtual beam identifier for the first transmission beam among the plurality of virtual beam identifiers.

7. The method of claim 6, wherein the allocating of the resource segments to the terminal comprises distributing the resource segments among the FAs used by the first transmission beam through frequency hopping using the first virtual beam identifier as an offset.

8. The method of claim 7, wherein the base station is incorporated in a millimeter wave wireless communication system.

9. A method for a base station to configure a virtual beam identifier, the method comprising:
    forming M×N (M and N are natural numbers, and M×N is a product of multiplication of the natural number M by the natural number N) transmission beams by M×N transmission antenna elements;
    configuring M×N beam different identifiers for the M×N transmission beams; and
    configuring M×N virtual beam identifiers for the M×N transmission beams based on a maximum number of transmission beams from the M×N transmission beams that may spatially overlap one another, and the beam identifiers, the beam identifiers are different than the virtual beam identifiers,
    wherein configuring, by the base station, the virtual beam identifiers comprises:
        grouping the transmission beams into beam sets of spatially adjacent transmission beams; and
        assigning a different virtual beam identifier to each transmission beam within each separate beam set, each beam set including the same virtual beam identifiers as each other beam set, the virtual beam identifiers being assigned such that the virtual beam identifier of each transmission beam is different from the virtual beam identifier of each adjacent transmission beam of an adjacent beam set, and
    wherein the base station is configured to transmit the transmission beams by transmitting at least two adjacent transmission beams of adjacent beam sets to partially overlap each other.

10. The method of claim 9, wherein the configuring of virtual beam identifiers comprises:
    when the maximum number of transmission beams is K (K is a natural number equal to or greater than 2), performing a modulo K operation on a value of each of the M×N beam identifiers to calculate a remainder; and configuring the remainder for each beam identifier as a value of each of the M×N virtual beam identifiers for the M×N transmission beams.

11. The method of claim 10, wherein the configuring of beam identifiers comprises:

creating P (P is a natural number) beam sets by dividing the M×N transmission beams by K; and configuring beam identifiers for the P beam sets in such a way that the values of the beam identifiers are arranged in a same sequence as the P beam sets.

12. The method of claim 11, wherein the configuring of beam identifiers for the P beam sets comprises configuring K beam identifiers for transmission beams in a J-th (J is a natural number) beam set, among the P beam sets, in such a way that the values of the beam identifiers are arranged in the same sequence as the transmission beams in the J-th beam set.

13. The method of claim 12, wherein the M and the N are a same natural number equal to or greater than 2, the K is 4, and the J-th beam set comprises 2×2 transmission beams.

14. The method of claim 13, wherein the base station is incorporated in a millimeter wave wireless communication system.

15. A base station comprising:

a memory; and a processor connected to the memory, wherein the processor configures a plurality of beam identifiers for a plurality of transmission beams formed by a plurality of transmission antenna elements, and configures a plurality of virtual beam identifiers for the plurality of transmission beams based on a maximum number of transmission beams out of the plurality of transmission beams, that are adjacent to one another, and based on the beam identifiers, the beam identifiers are different than the virtual beam identifiers, wherein configuring, by the base station, the plurality of virtual beam identifiers comprises:

grouping the plurality of transmission beams into beam sets of spatially adjacent transmission beams, and assigning a different virtual beam identifier to each transmission beam within each separate beam set, each beam set including the same virtual beam identifiers as each other beam set, the virtual beam identifiers being assigned such that the virtual beam identifier of each transmission beam is different from the virtual beam identifier of each adjacent transmission beam of an adjacent beam set, and wherein the transmitting of the plurality of transmission beams by the base station includes transmitting at least one transmission beam among the plurality of transmission beams to partially overlap at least one adjacent transmission beam of an adjacent beam set.

16. The base station of claim 15, wherein, when the maximum number of transmission beams is K (K is a natural number equal to or greater than 2), the processor performs a modulo K operation on a value of each of the M×N beam identifiers (M and N are natural numbers, and M×N is a product of multiplication of the natural number M by the natural number N) to calculate a remainder, and configures the remainder for each beam identifier as a value of each of the M×N virtual beam identifiers for the M×N transmission beams.

17. The base station of claim 16, wherein the processor creates P (P is a natural number) beam sets by dividing the M×N transmission beams by K, and configures beam identifiers for the P beam sets in such a way that the values of the beam identifiers are arranged in a same sequence as the P beam sets.

18. The base station of claim 17, wherein the processor configures K beam identifiers for transmission beams in a J-th (J is a natural number) beam set, among the P beam sets, in such a way that the values of the beam identifiers are arranged in the same sequence as the transmission beams in the J-th beam set.

19. The base station of claim 18, wherein the processor segments a first frequency resource for a terminal into a number of frequency assignments (FA) used by a first transmission beam to which the terminal belongs among the M×N transmission beams, and allocates resource segments to the terminal by using a first virtual beam identifier for the first transmission beam among the M×N virtual beam identifiers.

20. The base station of claim 19, wherein the processor distributes the resource segments among the FAs used by the first transmission beam through frequency hopping using the first virtual beam identifier as an offset.

\* \* \* \* \*